(12) United States Patent
Sato

(10) Patent No.: US 10,124,835 B2
(45) Date of Patent: Nov. 13, 2018

(54) HOLE PLUG

(71) Applicant: NIFCO INC., Yokosuka-shi, Kanagawa (JP)

(72) Inventor: Takehiro Sato, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 0 days.

(21) Appl. No.: 15/889,830

(22) Filed: Feb. 6, 2018

(65) Prior Publication Data

US 2018/0162455 A1 Jun. 14, 2018

Related U.S. Application Data

(63) Continuation of application No. 15/029,491, filed as application No. PCT/JP2014/078246 on Oct. 23, 2014, now Pat. No. 9,969,438.

(30) Foreign Application Priority Data

Oct. 24, 2013 (JP) ................................. 2013-220809

(51) Int. Cl.
    *B62D 25/24* (2006.01)
    *F16J 13/14* (2006.01)
    *F16J 15/02* (2006.01)
    *F16B 37/14* (2006.01)

(52) U.S. Cl.
    CPC .............. *B62D 25/24* (2013.01); *F16J 13/14* (2013.01); *F16J 15/025* (2013.01); *F16B 37/14* (2013.01)

(58) Field of Classification Search
    CPC ............ B62D 25/24; F16J 13/14; F16J 15/025
    USPC .............................................. 296/146.7, 146.6
    See application file for complete search history.

(56) References Cited

U.S. PATENT DOCUMENTS

2011/0233950 A1* 9/2011 Takita .................. B60R 16/0222
                                                              296/1.06

FOREIGN PATENT DOCUMENTS

JP        2013127310       *  6/2013
WO    WO-2012014531 A1  *  2/2012 ............. B62D 25/24

* cited by examiner

*Primary Examiner* — Joseph D. Pape
(74) *Attorney, Agent, or Firm* — Manabu Kanesaka

(57) ABSTRACT

A hole plug includes a ceiling part covering an attachment hole formed in an attachment member, a flange part connected to the ceiling part and covering an opening peripheral surface of the attachment hole formed in the attachment member at a predetermined inclined angle against the opening peripheral surface, a cylindrical outer peripheral wall part extending downward from an inner edge part of the flange part, and a connection member connecting the lower part of the outer peripheral wall part to the ceiling part. The outer peripheral wall part includes an upper part extending downward from the inner edge part of the flange part, a lower part formed coaxially with and radially inward to the upper part, and a bent part connecting the upper and lower parts of the outer peripheral wall part and having a thickness less than that of the upper part located above the bent part.

6 Claims, 10 Drawing Sheets

HOLE PLUG

CROSS-REFERENCE TO RELATED APPLICATION

This is a continuation application of Ser. No. 15/029,491 filed on Apr. 14, 2016, which is a PCT International Application PCT/JP2014/078246 filed on Oct. 23, 2014 claiming a priority of Japanese Patent Application NO. 2013-220809 filed on Oct. 24, 2013, the disclosure of which is incorporated herein.

TECHNICAL FIELD

The present invention relates to a hole plug which is inserted into an attachment hole to seal the attachment hole formed on an attachment member such as a part of a vehicle body panel of a vehicle.

BACKGROUND ART

For example, a conventional hole plug has, as shown in FIG. 20, an integral structure formed of synthetic resin and the like. In an insertion part 1, a front side flange part 2 and a back side flange part 3 are formed to face each other. The hole plug seals an attachment hole from both sides of the attachment hole by means of the front side flange part 2 and the back side flange part 3 (Patent Literature 1).

CITATION LIST

Patent Literature

Patent Literature 1: JP 2008-51314 A

SUMMARY OF INVENTION

Technical Problem

However, since the conventional hole plug described above has a structure which presses the attachment member by a sealing member such as a flange part from both sides of the attachment member, when the insertion part 1 is inserted and fitted into an insertion hole, a load generated when a back side sealing member is deformed and pressed into the insertion hole and resistance generated when a tip of a front side sealing member (flange part) is deformed by contacting with an opening peripheral surface of the attachment member are both applied to the hole plug. As a result, a high insertion force is required and therefore assemble ability of the hole plug is deteriorated.

The present invention is to solve the problem described above and has an object to provide a hole plug which includes a flange part associating bending part (bent part) formed as a base point in order for bending an upper part of an outer peripheral wall part of the hole plug from a predetermined position of the outer peripheral wall part of the hole plug in a direction (diameter reduction direction) away from an attachment hole when a tip of a flange part contacts an opening peripheral surface of the attachment member, and therefore the hole plug is capable of reducing an insertion resistance.

Solution to Problem

To achieve the above object, the present invention provides a hole plug comprising a flange part which covers an opening peripheral surface of an attachment hole formed in an attachment member at a predetermined inclined angle against the opening peripheral surface; and a cylindrical outer peripheral wall part formed to extend downward from an inner edge part of the flange part, wherein a flange part associating bending part is formed as a base point for bending an upper part of the outer peripheral wall part from a predetermined position of the outer peripheral wall part in a direction away from a hole edge when a tip of the flange part is contacted with the opening peripheral surface of the attachment member.

A hole plug according to the present invention is preferably formed as aspects (1) to (3) described below.

(1) An engagement part which engages a back side opening edge of the attachment member is formed to protrude from a lower part lower than the flange part interlocking bending part. According to this preferable aspect, it is possible to reduce an insertion load, corresponding to variation of thickness of an attachment member and to maintain a water sealing property.

(2) An elastically deformable back side sealing part which covers a back side opening edge of the attachment member is formed to protrude from a lower part lower than the flange part associating bending part. According to this preferable aspect, it is possible to reduce the insertion load and to respond to variation of thickness of the attachment member.

(3) In the hole plug according to (2), a cross-sectional area in a direction perpendicular to an insertion direction of a lower part of the outer peripheral wall part lower than the flange part associating bending part is smaller than a cross-sectional area of an upper part of the outer peripheral wall part, and the back side sealing part is stored into the lower part of the outer peripheral wall part when the hole plug is inserted into the attachment hole. According to this preferable aspect, it is possible to reduce the insertion load and to correspond to variation of thickness of the attachment member.

Advantageous Effects of Invention

According to the hole plug of the present invention, the hole plug includes a flange part which covers an opening peripheral surface of an attachment hole formed on an attachment member at a predetermined inclined angle against the opening peripheral surface, and a cylindrical outer peripheral wall part formed to extend downward from an inner edge part of the flange part, wherein a flange part associating bending part is formed as a base point for bending an upper part of the outer peripheral wall part from a predetermined position of the outer peripheral wall part in a direction away from a hole edge when a tip of the flange part is contacted with the opening peripheral surface of the attachment member. Thus, this configuration can reduce an insertion load, respond to variation of thickness of the attachment member and maintain a water sealing property.

DESCRIPTION OF EMBODIMENTS

In the present invention, a hole plug includes a flange part which covers an opening peripheral surface of an attachment hole formed on an attachment member at a predetermined inclined angle against the opening peripheral surface, and a cylindrical outer peripheral wall part formed to extend downward from an inner edge part of the flange part, the hole plug further including a flange part associating a bending part formed as a base point for bending an upper part of the outer peripheral wall part from a predetermined position of the outer peripheral wall part in a direction away from a hole edge when a tip of the flange part is contacted with the opening peripheral surface of the attachment member. When the hole plug is inserted and the tip of the flange part is contacted with the opening peripheral surface of the attachment member, the outer peripheral wall part recedes. This configuration can reduce an insertion load and maintain a sealing property. Further, a thickness tolerance against the attachment member can be widened.

First Embodiment

Figure 1:
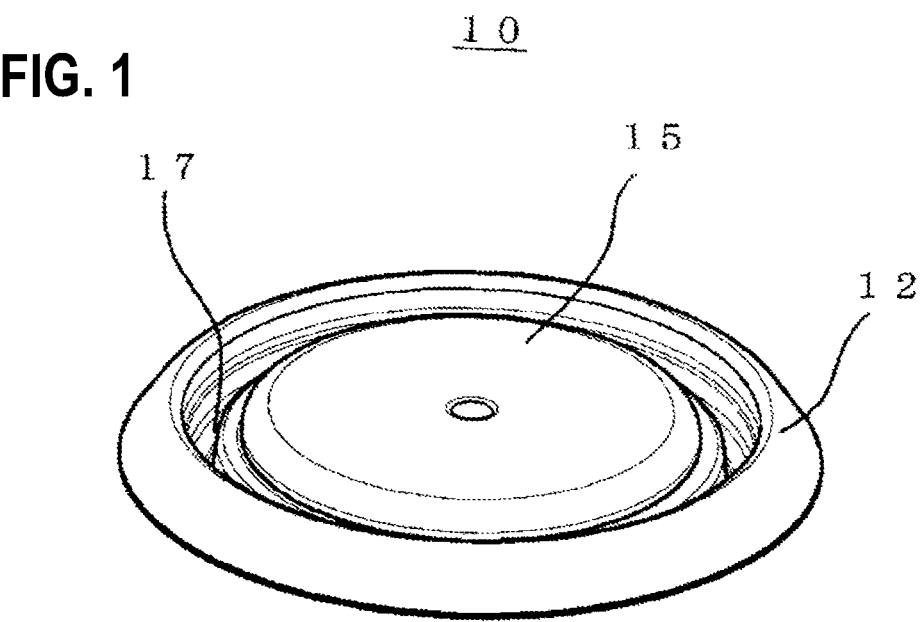
FIG. 1 illustrates a perspective view of a hole plug according to a first embodiment of the present invention.
Figure 2:
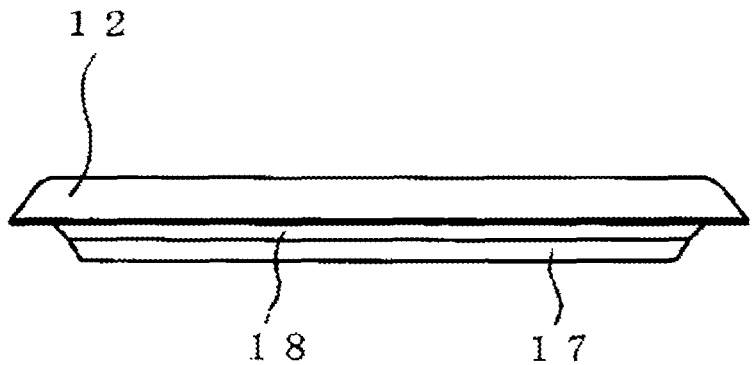
FIG. 2 illustrates a front view of the hole plug.
Figure 3:
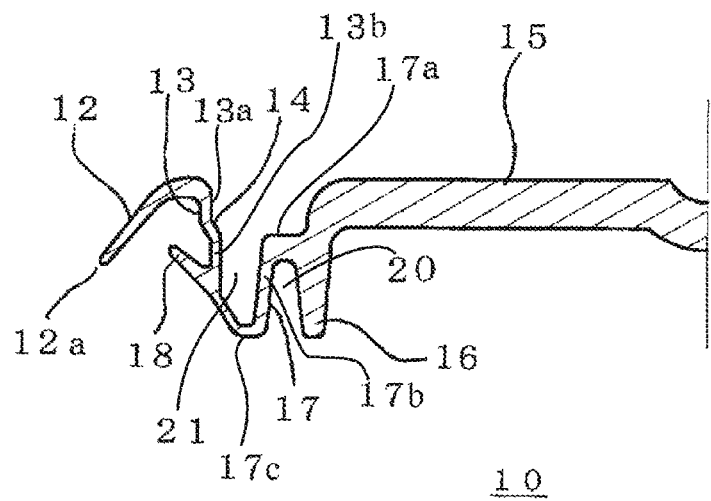
FIG. 3 illustrates a cross-sectional view of a main part of the hole plug.

Hereinafter, the present invention is described with reference to the drawings illustrating one embodiment. FIG. 1 illustrates a perspective view of a hole plug according to a first embodiment of the present invention, FIG. 2 illustrates a front view of the hole plug and FIG. 3 illustrates a cross-sectional view of a main part of the hole plug. Here, a hole plug 10 of the present invention includes a flange part 12 which covers an opening peripheral surface 11a (see FIG. 6) of an attachment hole formed on an attachment member 11 (see FIG. 4) at a predetermined inclined angle against the opening peripheral surface 11a, and a cylindrical outer peripheral wall part 13 formed to extend downward from an inner edge part of the flange part 12, the hole plug further including a flange part associating bending part (bent part) 14 formed as a base point in order for bending an upper part of the outer peripheral wall part 13 from a predetermined position of the outer peripheral wall part 13 in a direction away from a hole edge when a tip 12a of the flange part 12 is contacted with the opening peripheral surface 11a of the attachment member 11.

The flange part 12 forms an outer periphery of the hole plug 10. In this embodiment, the flange part 12 is formed in a true-circle shape. Further, a true circular ceiling part 15 is formed at the center part of the hole plug 10, and a cylindrical base wall 16 is formed to extend downward from the ceiling part 15. Further, a connection member 17 is formed to extend outward from the base wall 16. The connection member 17 is once extended downward and thereafter extended upward from a region proximal to a substantially lower end of the base wall 16, and the connection member 17 is connected to the outer peripheral wall part 13 which covers an attachment hole H (see FIG. 4). Namely, the connection member includes a first part 17a extending outwardly from the base wall 16, a second part 17b extending downward from the first part 17a, and a third part 17c extending outward from the second part 17b and connected to the lower part of the outer peripheral wall part 13. Also, a first space 20 is formed between the second part 17b of the connection member and the base wall 16, and a second space 21 is formed between the second part 17b of the connection member and the outer peripheral wall part 13. Further, a back side sealing part 18, which is elastically deformable, is formed to protrude in an outer peripheral direction from a part of the outer peripheral wall part 13 lower than the flange part associating bending part 14.

Figure 4:
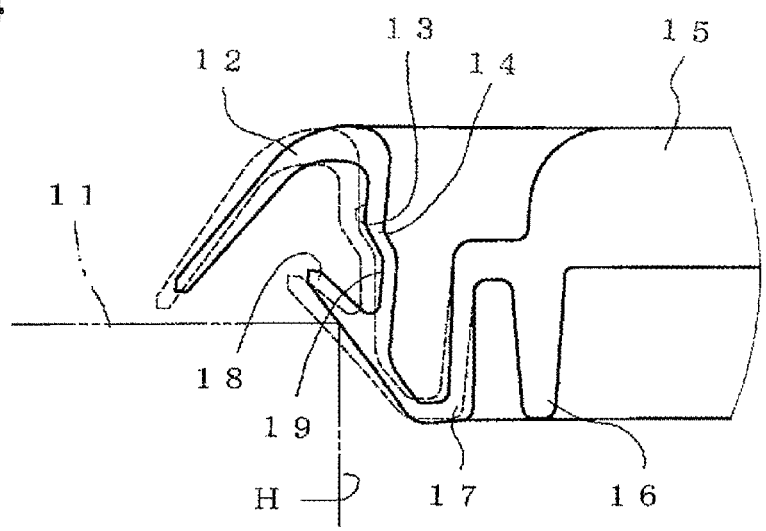
FIG. 4 illustrates an insertion process of the hole plug.
Figure 5:
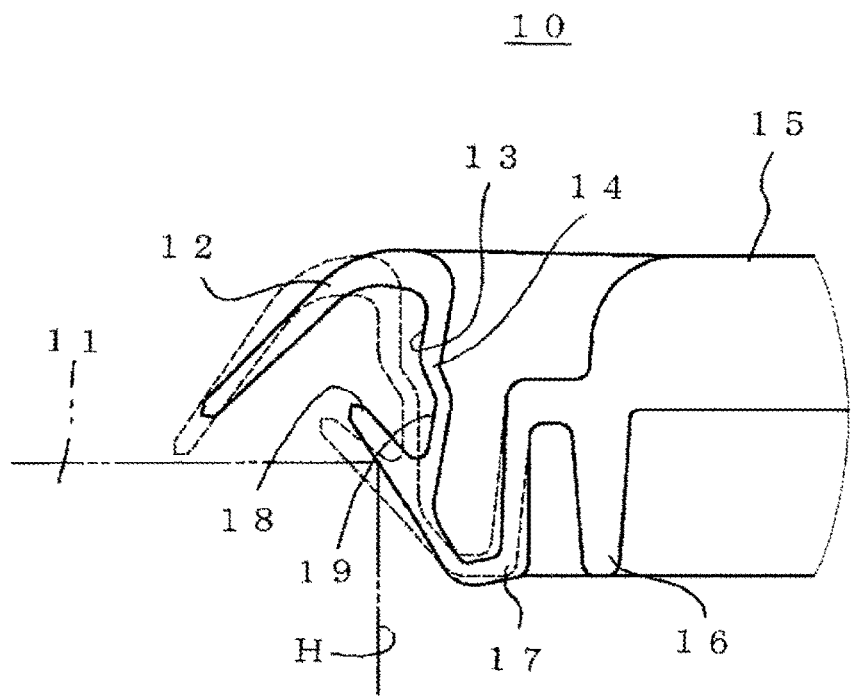
FIG. 5 illustrates the insertion process of the hole plug.

A lower part of the outer peripheral wall part 13 lower than the flange part associating bending part 14 is formed such that its cross-sectional area in a direction perpendicular to an insertion direction of the hole plug is to be small (thin), and a recess part 19 into which the back side sealing part 18 is stored when the back side sealing part 18 is inserted into the attachment hole H is formed outside the outer peripheral wall part 13 (see FIG. 4). Namely, the outer peripheral wall part 13 includes an upper part 13a and a lower part 13b formed inward to the upper part 13a. The flange part 12 and the back side sealing part 18 are arranged to face each other. The back side sealing part 18 is also formed in a true-circle ring shape on an outer periphery of the outer peripheral wall part 13, and integrally formed with the connection member 17, the base wall 16, the ceiling part 15 and the like.

Figure 6:
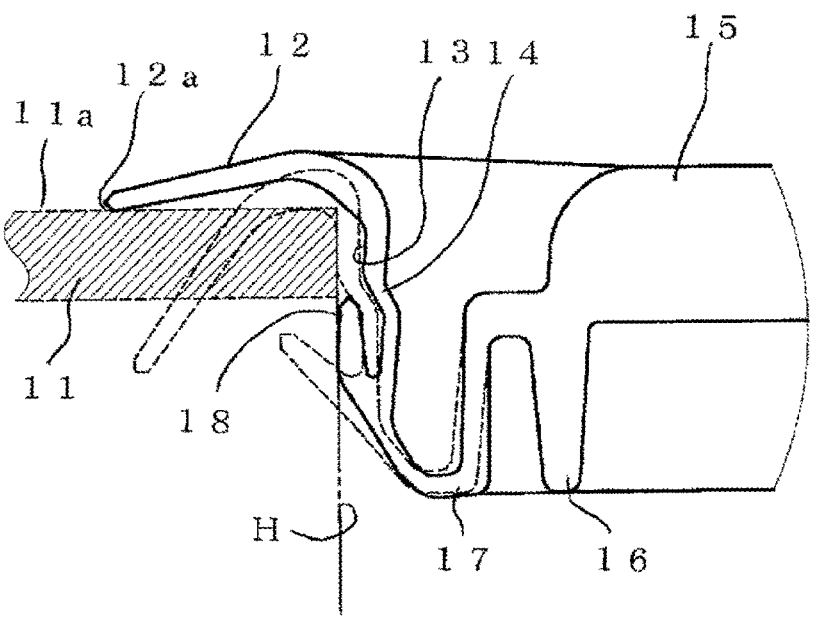
FIG. 6 illustrates the insertion process of the hole plug.

Next, an attaching procedure of the hole plug 10 is described with reference to FIGS. 4 to 7. First, the hole plug 10 is inserted into the attachment hole H by pushing the ceiling part 15 after positioning the center of the back side sealing part 18 at the attachment hole H formed on the attachment member 11. At this time, the back side sealing part 18 is bent while being elastically deformed and stored into the recess part 19 formed on the outer peripheral wall part 13, and therefore the back side sealing part 18 is easily passed through the attachment hole H. The back side sealing part 18 passed through the attachment hole H recovers substantially its original size when coming out from the recess part 19. At the same time, the tip 12a of the flange part 12 is contacted with the opening peripheral surface 11a of the attachment member 11, and as shown in FIG. 6, the flange part 12 is rotated around the flange part associating bending part 14. When the flange part 12 is rotated around the flange part associating bending part 14, the outer peripheral wall part 13 is bent in a direction away from a hole edge of the attachment hole H, and a diameter of the outer peripheral wall part 13 is reduced. Accordingly, further reduction of the insertion force can be achieved.

Figure 7:
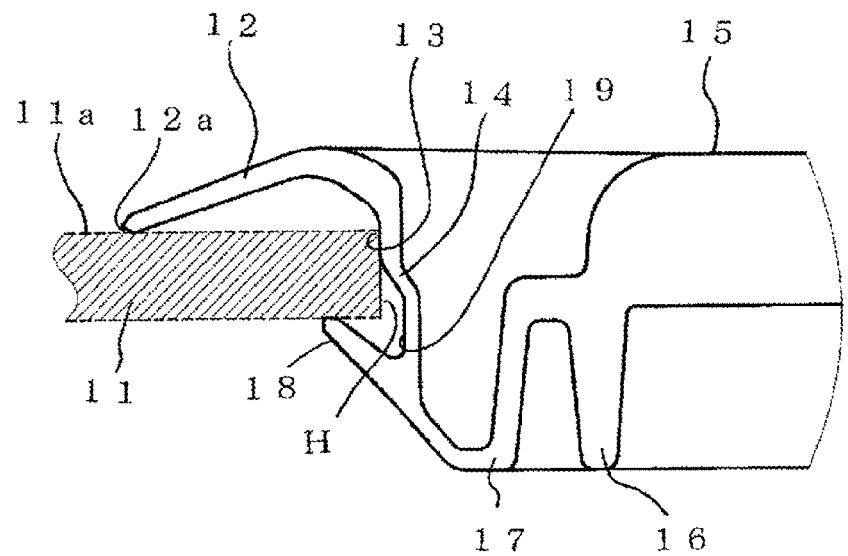
FIG. 7 illustrates the insertion process of the hole plug.

Further, when the pushing of the ceiling part 15 is stopped, as shown in FIG. 7, the hole plug 10 is moved upward slightly by a resilience of the flange part 12 and therefore a tip of the back side sealing part 18 is contacted with a lower surface of the attachment member 11 and the tip 12a of the flange part 12 is contacted with the opening peripheral surface 11a of the attachment member 11. Further, the outer peripheral wall part 13 is fitted into the attachment hole H. Since the flange part 12 and the back side sealing part 18 are arranged to face each other and contacted with both surfaces of the attachment member 11 respectively, a water sealing property of the both surfaces of the attachment member 11 can be improved. Further, a thickness tolerance against the attachment member 11 can be widened.

Figure 8:
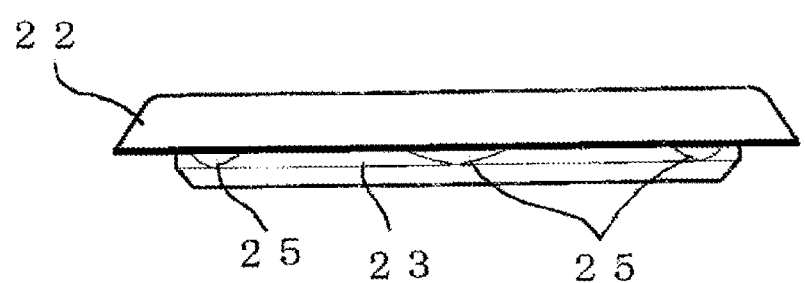
FIG. 8 illustrates a front view of a hole plug according to a second embodiment of the present invention.
Figure 9:
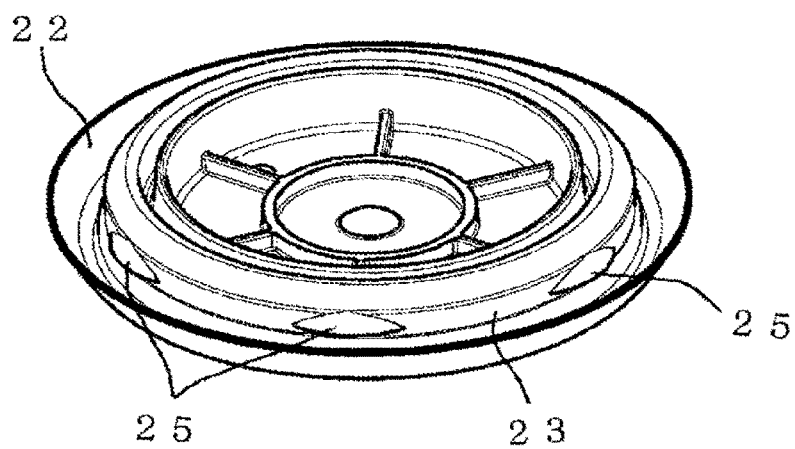
FIG. 9 illustrates a perspective view of a bottom of the hole plug.
Figure 10:
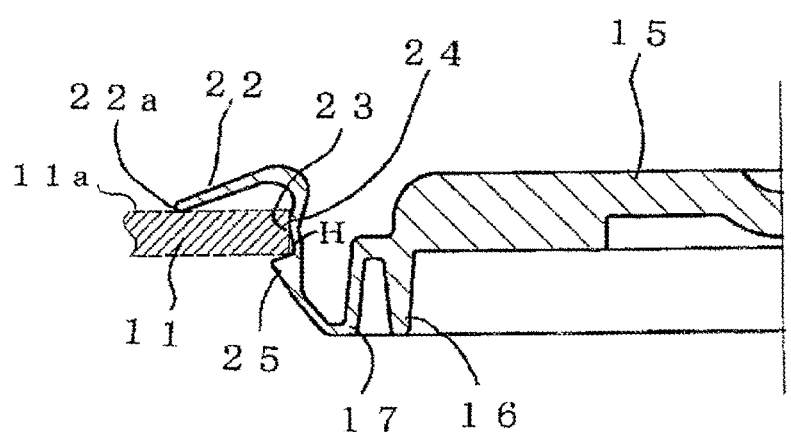
FIG. 10 illustrates a cross-sectional view of a main part of the hole plug in a state in which the hole plug is utilized.

FIGS. 8 to 10 illustrate a second embodiment of the present invention. FIG. 8 illustrates a front view of a hole plug according to the second embodiment of the present invention, FIG. 9 illustrates a perspective view of a bottom of the hole plug of the present invention, and FIG. 10 illustrates a cross-sectional view of a main part of the hole plug of the present invention in a state in which the hole plug is utilized. In this embodiment, a hole plug 20 includes a flange part 22 which covers an opening peripheral surface 11a of an attachment hole H formed on an attachment member 11 at a predetermined inclined angle against the opening peripheral surface 11a, and an outer peripheral wall part 23 formed cylindrically so as to extend downward from an inner edge part of the flange part 22, the hole plug further including a flange part associating bending part 24 formed as a base point in order for bending an upper part of the outer peripheral wall part 23 from a predetermined position of the outer peripheral wall part 23 in a direction away from a hole edge when a tip 22a of the flange part 22 is contacted with the opening peripheral surface 11a of the attachment member 11.

Further, an engagement part 25 to be engaged with a back side opening edge of the attachment member 11 is formed to protrude from a lower part lower than the flange part associating bending part 24. Other components, which are the ceiling part 15, the base wall 16 and the connection member 17, are the same as those in the first embodiment and the explanation thereof is therefore omitted.

A plurality of the engagement parts 25 is arranged on the outer peripheral wall part 23 at a predetermined interval, and each of the engagement part 25 is engaged with the back side edge part of the attachment hole H of the attachment member 11.

The hole plug 20 formed as described above is inserted into the attachment hole H by pushing the ceiling part 15 after positioning the center of the hole plug 20 at the attachment hole H formed on the attachment member 11. At this time, the engagement part 25 is bent while being elastically deformed and passed through the attachment hole H. The engagement part 25 passed through the attachment hole H recovers substantially its original size. At this time, the tip 22a of the flange part 22 is contacted with the opening peripheral surface 11a of the attachment member 11, and the flange part 22 is rotated around the flange part associating bending part 24. When the flange part 22 is rotated around the flange part associating bending part 24, the outer peripheral wall part 23 is bent in a direction away from a hole edge of the attachment hole H, and a diameter of the outer peripheral wall part 23 is reduced. Accordingly, reduction of the insertion force can be achieved. This embodiment is not formed to seal the back side surface but formed to engage the engagement part 25 with the back side surface.

Figure 11:
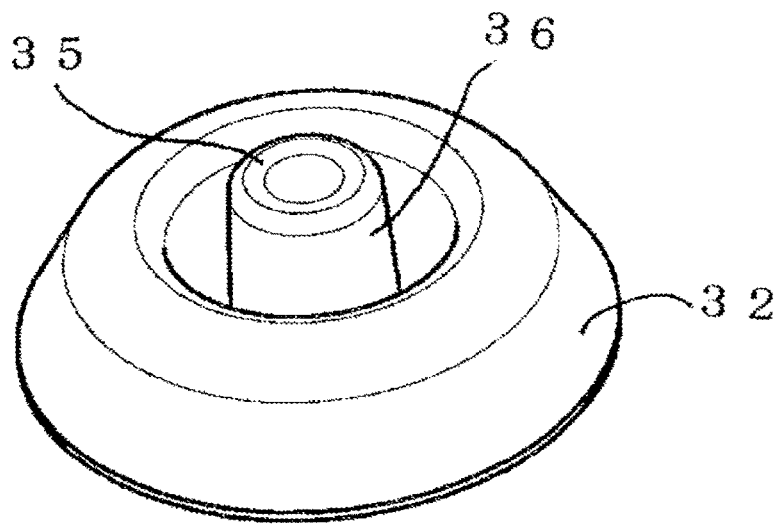
FIG. 11 illustrates a perspective view of a hole plug according to a third embodiment of the present invention.
Figure 12:
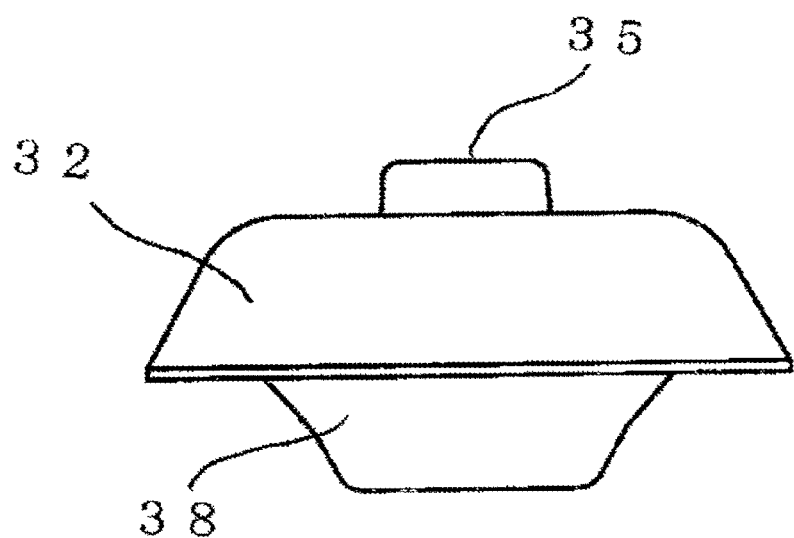
FIG. 12 illustrates a front view of the hole plug.
Figure 13:
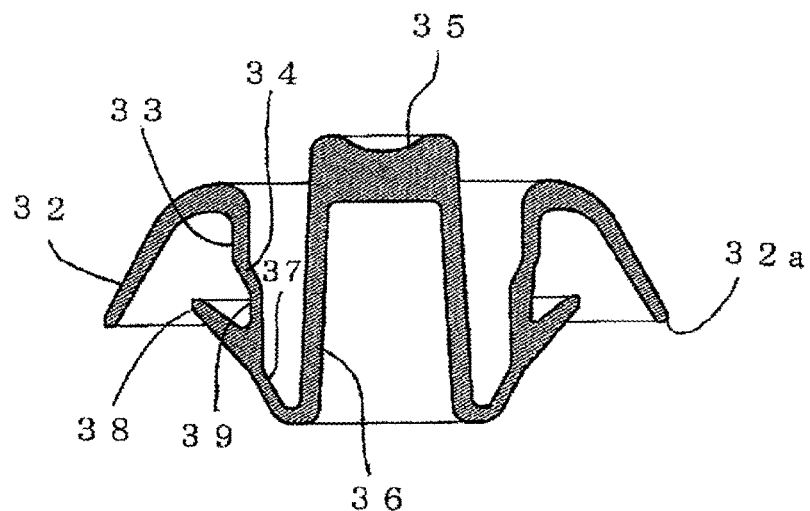
FIG. 13 illustrates a vertical cross-sectional view of the hole plug.

FIGS. 11 to 13 illustrate a third embodiment of the present invention. FIG. 11 illustrates a perspective view of a hole plug according to the third embodiment of the present invention, FIG. 12 illustrates a front view of the hole plug of the present invention, and FIG. 13 illustrates a vertical cross-sectional view of the hole plug of the present invention. In this embodiment, a hole plug 30 is formed in a substantially circular shape in a plan view. The hole plug 30 includes an outer peripheral wall part 33 which is inserted into an attachment hole H formed on an attachment member 11 to seal the attachment hole, a flange part 32 formed in an umbrella-like shape and extended outward from an upper end of the outer peripheral wall part 33, a main cylinder 36 arranged inside the outer peripheral wall part 33 and having an opening end at a side opposite to the outer peripheral wall part 33, and a flange part associating bending part 34 formed as a base point in order for bending an upper part of the outer peripheral wall part 33 from a predetermined position of the outer peripheral wall part 33 in a direction away from a hole edge when a tip 32a of the flange part 32 is contacted with the opening peripheral surface 11a of the attachment member 11. Further, a lower part of the outer peripheral wall part 33 lower than the flange part associating bending part 34 is formed such that its cross-sectional area in a direction perpendicular to an insertion direction of the hole plug is to be small (thin), and a recess part 39 into which a back side sealing part 38 is stored when the back side sealing part 38 is inserted into the attachment hole H is formed on the outer peripheral wall part 33. Further, a small circular ceiling part 35 is formed at a top part of the main cylinder 36. Further, a recess part is formed at the center of the ceiling part 35.

Further, the back side sealing part 38, which is elastically deformable, is formed to protrude in an outer peripheral direction from a lower part of the outer peripheral wall part 33 lower than the flange part interlocking bending part 34, and the attachment member 11 is interposed between the flange part 32 and the back side sealing part 38.

The hole plug 30 formed as described above is inserted into the attachment hole H by pushing the ceiling part 35 after positioning the center of the hole plug 30 at the attachment hole H formed on the attachment member 11. At this time, the back side sealing part 38 is bent while being elastically deformed and stored into the recess part 39 formed on the outer peripheral wall part 33 and then the back side sealing part 38 is passed through the attachment hole H. The back side sealing part 38 passed through the attachment hole H recovers substantially its original size when coming out from the recess part 39. At the same time, the tip 32a of the flange part 32 is contacted with the opening peripheral surface 11a of the attachment member 11, and the flange part 32 is rotated around the flange part associating bending part 34. When the flange part 32 is rotated around the flange part associating bending part 34, the outer peripheral wall part 33 is bent in a direction away from a hole edge of the attachment hole H, and a diameter of the outer peripheral wall part 33 is reduced. Accordingly, reduction of the insertion force can be achieved.

Figure 14:
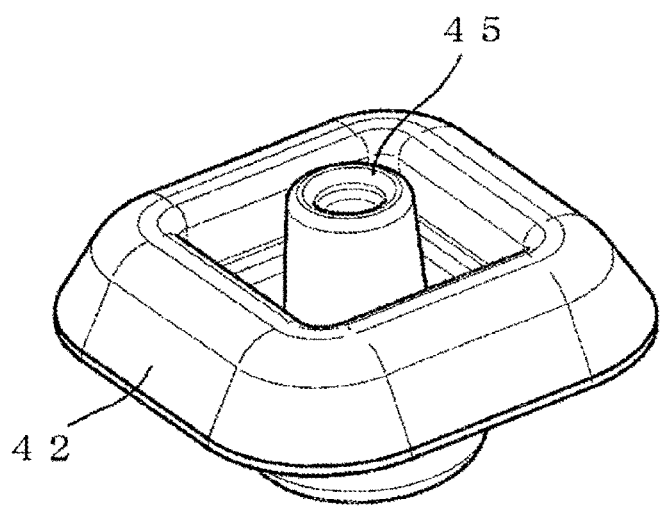
FIG. 14 illustrates a perspective view of a hole plug according to a fourth embodiment of the present invention.
Figure 15:
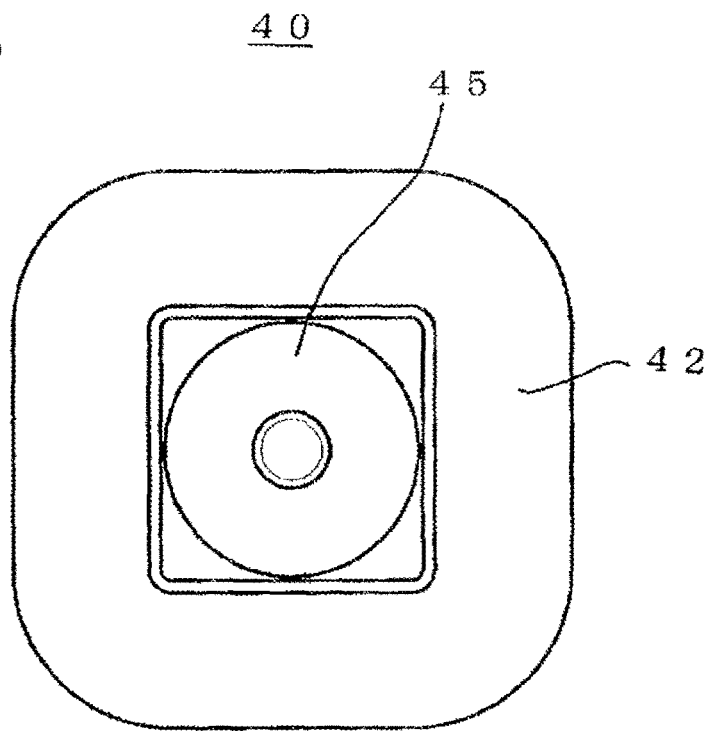
FIG. 15 illustrates a plan view of the hole plug.
Figure 16:
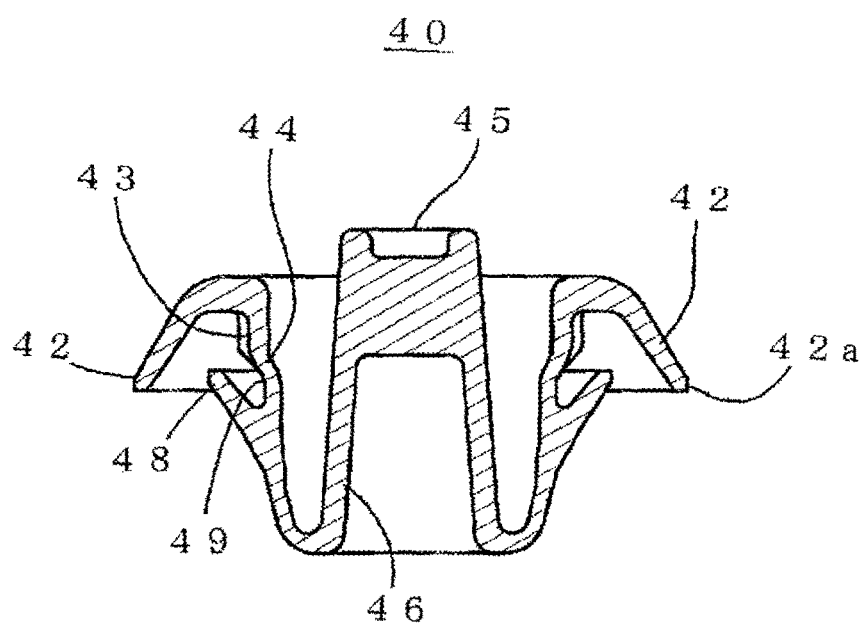
FIG. 16 illustrates a vertical cross-sectional view of the hole plug.

FIGS. 14 to 16 illustrate a fourth embodiment of the present invention. FIG. 14 illustrates a perspective view of a hole plug according to the fourth embodiment of the present invention, FIG. 15 illustrates a plan view of the hole plug of the present invention, and FIG. 16 illustrates a vertical cross-sectional view of the hole plug of the present invention. In this embodiment, a hole plug 40 is formed in a rectangular shape with rounded corners in a plan view. The hole plug 40 includes an outer peripheral wall part 43 which is inserted into an attachment hole H formed on an attachment member 11 to seal the attachment hole H, a flange part 42 formed in an umbrella-like shape and extended outward from an upper end of the outer peripheral wall part 43, a main cylinder 46 arranged inside the outer peripheral wall part 43 and formed in a polygonal cylindrical shape with an opening end at a side opposite to the outer peripheral wall part 43, and a flange part associating bending part 44 formed as a base point in order for bending an upper part of the outer peripheral wall part 43 from a predetermined position of the outer peripheral wall part 43 in a direction away from a hole edge when a tip 42a of the flange part 42 is contacted with the opening peripheral surface 11a of the attachment member 11. Further, a lower part of the outer peripheral wall part 43 lower than the flange part associating bending part 44 is formed such that its cross-sectional area in a direction perpendicular to an insertion direction of the hole plug is to be small (thin), and a recess part 49 into which a back side sealing part 48 is stored when the back side sealing part 48 is inserted into the attachment hole H is formed on the outer peripheral wall part 43. Further, a ceiling part 45 is formed at a top part of the main cylinder 46.

The hole plug 40 formed as described above is inserted into the attachment hole H by pushing the ceiling part 45 after positioning the center of the hole plug 40 at the attachment hole H formed on the attachment member 11. At this time, the back side sealing part 48 is bent while being elastically deformed and stored into the recess part 49 formed on the outer peripheral wall part 43, and then the back side sealing part 48 is passed through the attachment hole H. The back side sealing part 48 passed through the attachment hole H recovers substantially its original size when coming out from the recess part 49. At the same time, the tip 42a of the flange part 42 is contacted with the opening peripheral surface 11a of the attachment member 11, and the flange part 42 is rotated around the flange part associating bending part 44. When the flange part 42 is rotated around the flange part associating bending part 44, the outer peripheral wall part 43 is bent in a direction away from a hole edge of the attachment hole H, and a diameter of the outer peripheral wall part 43 is reduced. Accordingly, reduction of the insertion force can be achieved. Further, since both surfaces of the attachment member 11 are sealed, a sealing property can be maintained.

Figure 17:
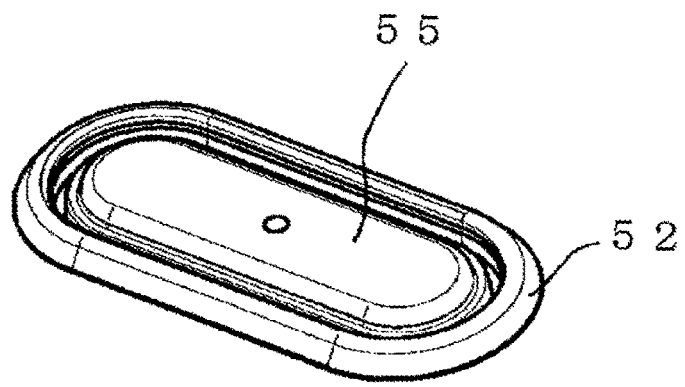
FIG. 17 illustrates a perspective view of a hole plug according to a fifth embodiment of the present invention.
Figure 18:
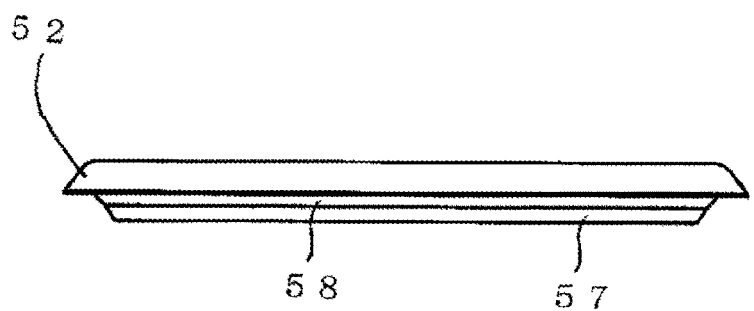
FIG. 18 illustrates a front view of the hole plug.
Figure 19:
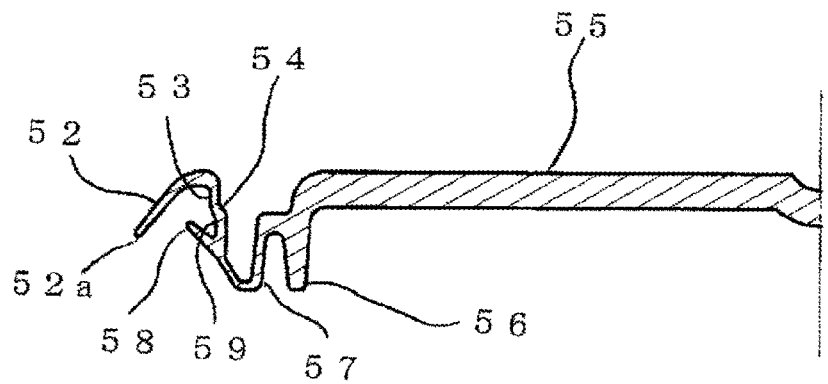
FIG. 19 illustrates a vertical cross-sectional view of a main part of the hole plug.
Figure 20:
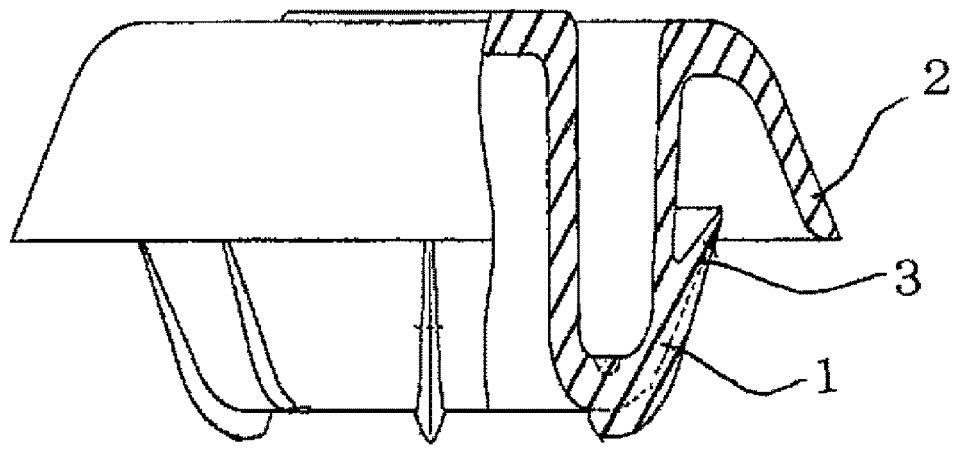
FIG. 20 illustrates one example of a conventional hole plug.

FIG. 17 illustrates a perspective view of a hole plug according to a fifth embodiment of the present invention, FIG. 18 illustrates a plan view of the hole plug of the present invention, and FIG. 19 illustrates a vertical cross-sectional view of a main part of the hole plug of the present invention. In this embodiment, a hole plug 50 is formed in an ellipse shape in a plan view. In this embodiment, the hole plug 50 includes a flange part 52 which covers an opening peripheral surface 11a of an attachment hole H formed on an attachment member 11 at a predetermined inclined angle against the opening peripheral surface 11a, and an outer peripheral wall part 53 formed in an elliptic cylindrical shape to extend downward from an inner edge part of the flange part 52, the hole plug further including a flange part associating bending part 54 formed as a base point in order for bending an upper part of the outer peripheral wall part 53 from a predetermined position of the outer peripheral wall part 53 in a direction away from a hole edge when a tip 52a of the flange part 52 is contacted with the opening peripheral surface 11a of the attachment member 11. Further, a back side sealing part 58, which is elastically deformable, is formed to protrude in an outer peripheral direction at a predetermined angle from a lower part of the outer peripheral wall part 53 lower than the flange part associating bending part 54, and the attachment member 11 is interposed between the flange part 52 and the back side sealing part 58.

Further, a lower part of the outer peripheral wall part 53 lower than the flange part associating bending part 54 is formed such that its cross-sectional area in a direction perpendicular to an insertion direction of the hole plug is to be small (thin), and a recess part 59 into which the back side sealing part 58 is stored when the back side sealing part 58 is inserted into the attachment hole H is formed on the outer peripheral wall part 53.

Other components, which are a ceiling part 55, a base wall 56 and a connection member 57, are the same as those in the first embodiment and the explanation thereof is therefore omitted.

The hole plug 50 formed as described above is inserted into the attachment hole H by pushing the ceiling part 55 after determining a direction of the hole plug 50 against the attachment hole H formed on the attachment member 11. At this time, the back side sealing part 58 is bent while being elastically deformed and stored into the recess part 59 formed on the outer peripheral wall part 53, and then the back side sealing part 58 is passed through the attachment hole H. The back side sealing part 58 passed through the attachment hole H recovers substantially its original size when coming out from the recess part 59. At the same time, the tip 52a of the flange part 52 is contacted with the opening peripheral surface 11a of the attachment member 11, and the flange part 52 is rotated around the flange part associating bending part 54. When the flange part 52 is rotated around the flange part associating bending part 54, the outer peripheral wall part 53 is bent in a direction away from a hole edge of the attachment hole H, and a diameter of the outer peripheral wall part 53 is reduced. Accordingly, reduction of the insertion force can be achieved.

The present invention is not limited to the embodiments described above and various design modifications may be adopted based on description of Claims.

Further, all contents of Description, Claims, Drawings, and Abstract of Japanese Patent Application No. 2013-220809 filed on Oct. 24, 2013, is cited and incorporated herein as a disclosure of the description of the present invention.

What is claimed is:

1. A hole plug comprising:
    a ceiling part adapted to cover an attachment hole formed in an attachment member;
    a flange part connected to the ceiling part and adapted to cover an opening peripheral surface of the attachment hole formed in the attachment member at a predetermined inclined angle against the opening peripheral surface;
    a cylindrical outer peripheral wall part formed to extend downward from an inner edge part of the flange part, the outer peripheral wall part including
        an upper part extending downward from the inner edge part of the flange part,
        a lower part formed inward to the upper part in the cylindrical outer peripheral wall part, and
        a bent part connecting the upper and lower parts of the cylindrical outer peripheral wall part and having a thickness less than that of the upper part located above the bent part;
    a connection member connecting the lower part of the cylindrical outer peripheral wall part to the ceiling part; and
    an engagement part adapted to engage a back side opening edge of the attachment member and protruding from the lower part of the cylindrical outer peripheral wall part lower than the bent part,
    wherein the upper part of the cylindrical outer peripheral wall part moves in a direction away from a hole edge of the attachment hole when a tip of the flange part contacts the opening peripheral surface of the attachment member.

2. A hole plug comprising:
a ceiling part adapted to cover an attachment hole formed in an attachment member;
a flange part connected to the ceiling part and adapted to cover an opening peripheral surface of the attachment hole formed in the attachment member at a predetermined inclined angle against the opening peripheral surface;
a cylindrical outer peripheral wall part formed to extend downward from an inner edge part of the flange part, the outer peripheral wall part including
an upper part extending downward from the inner edge part of the flange part,
a lower part formed inward to the upper part in the cylindrical outer peripheral wall part, and
a bent part connecting the upper and lower parts of the cylindrical outer peripheral wall part and having a thickness less than that of the upper part located above the bent part;
a connection member connecting the lower part of the cylindrical outer peripheral wall part to the ceiling part; and
an elastically deformable back side sealing part adapted to cover a back side opening edge of the attachment member and protruding from the lower part of the cylindrical outer peripheral wall part lower than the bent part,
wherein the upper part of the cylindrical outer peripheral wall part moves in a direction away from a hole edge of the attachment hole when a tip of the flange part contacts the opening peripheral surface of the attachment member.

3. The hole plug according to claim 2, wherein the lower part of the cylindrical outer peripheral wall part lower than the bent part has a cross-sectional area in a direction perpendicular to an insertion direction smaller than that of the upper part of the cylindrical outer peripheral wall part, and the back side sealing part deforms toward the lower part of the cylindrical outer peripheral wall part when the hole plug is inserted into the attachment hole.

4. The hole plug according to claim 1, wherein the lower part of the cylindrical outer peripheral wall part above the back side sealing part is formed with a recess part to receive the back side sealing part when the back side sealing part contacts the hole edge of the attachment hole and deforms toward the cylindrical outer peripheral wall part.

5. The hole plug according to claim 4, wherein the ceiling part includes a base wall extending downward from an outer periphery of the ceiling part; and
the connection member includes a first part extending outward from the base wall, a second part extending downward from the first part, and a third part extending outward from the second part and connected to the lower part of the cylindrical outer peripheral wall part.

6. The hole plug according to claim 5, wherein a first space is formed between the second part of the connection member and the base wall to allow the connection member to deform when the back side sealing part contacts the hole edge of the attachment hole, and
a second space is formed between the second part of the connection member and the cylindrical outer peripheral wall part to allow the cylindrical outer peripheral wall part to deform when the back side sealing part contacts the hole edge of the attachment hole.

* * * * *